United States Patent [19]

Tsukamoto et al.

[11] Patent Number: 5,398,095
[45] Date of Patent: Mar. 14, 1995

[54] AUTOMATIC ZOOMING DEVICE

[75] Inventors: Takeya Tsukamoto, Ibaraki; Masatoshi Itoh, Takatsuki, both of Japan

[73] Assignee: Minolta Camera Kabushiki Kaisha, Osaka, Japan

[21] Appl. No.: 99,374

[22] Filed: Jul. 30, 1993

Related U.S. Application Data

[63] Continuation of Ser. No. 682,236, Apr. 9, 1991, abandoned.

[30] Foreign Application Priority Data

| Apr. 9, 1990 | [JP] | Japan | 2-094827 |
| Apr. 9, 1990 | [JP] | Japan | 2-094828 |
| Apr. 9, 1990 | [JP] | Japan | 2-094829 |
| Apr. 18, 1990 | [JP] | Japan | 2-104153 |

[51] Int. Cl.⁶ .......................................... G03B 13/00
[52] U.S. Cl. ..................... 354/400; 354/195.12
[58] Field of Search ..................... 354/400–409, 354/195.1–195.12

[56] References Cited

U.S. PATENT DOCUMENTS

| 4,469,417 | 9/1984 | Masunaga et al. | 354/195.1 |
| 4,572,642 | 2/1986 | Yamamoto et al. | 354/195.1 |
| 4,866,468 | 9/1989 | Himuro et al. | 354/195.1 |
| 5,027,147 | 6/1991 | Kaneda | 354/400 |
| 5,060,001 | 10/1991 | Kaneda | 354/400 |
| 5,140,360 | 8/1992 | Tsukamoto et al. | 354/195.12 |

FOREIGN PATENT DOCUMENTS 1-250912 10/1989 Japan.

*Primary Examiner*—David M. Gray
*Attorney, Agent, or Firm*—Burns, Doane, Swecker & Mathis

[57] ABSTRACT

This zooming device performs auto-zooming by determining the focal length based on the object distance. When the degree of zooming is large, it performs zooming at a speed appropriate to that degree. Further, when a conversion lens is mounted to change the focal length, the device determines focal length while taking into account the degree of change in focal length effected by the conversion lens.

9 Claims, 15 Drawing Sheets

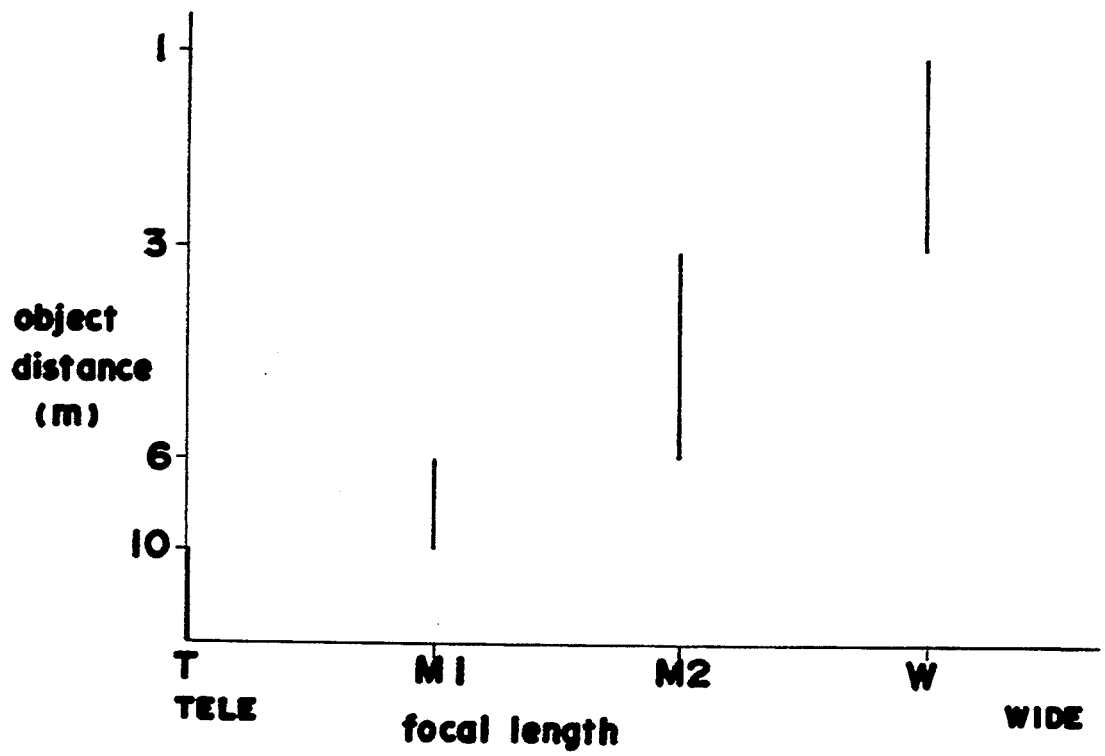

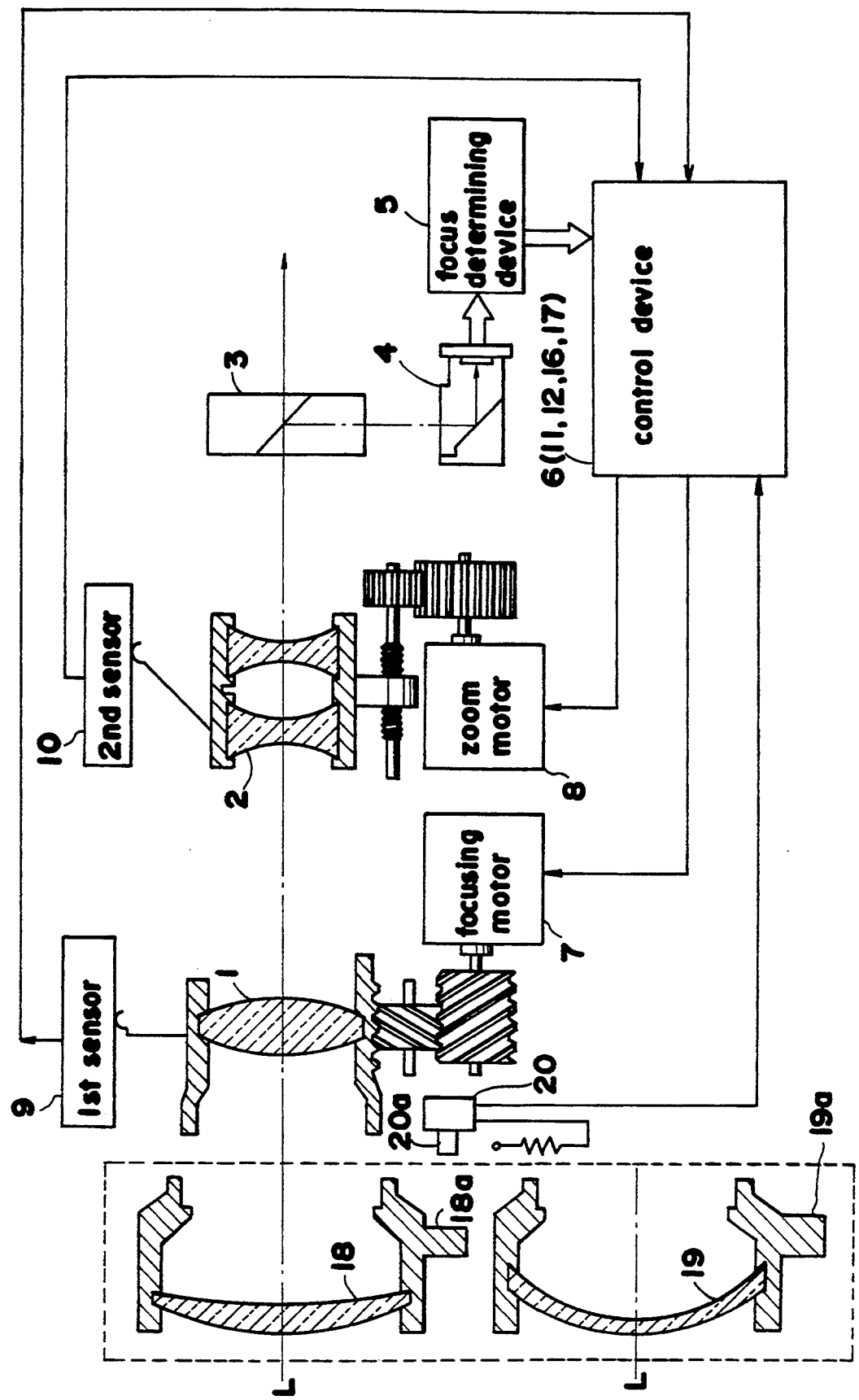

AUTOMATIC ZOOMING DEVICE

This application is a continuation of application Ser. No. 07/682,236, filed Apr. 9, 1991, now abandoned.

BACKGROUND OF THE INVENTION

1. Field of the Invention

This invention relates to a device which performs auto-zooming that is particularly useful in video cameras.

2. Description of the Related Art

When shooting footage with a video camera equipped with a zoom function, if the object is stationary, as in the case of scenery or still life, it is unnecessary to change the focal length once it is set. However, if the object is mobile, it is necessary to continuously correct the focal length according to the movement of the object in order to keep the size of the object image consistent in all shooting situations. When the object moves away from the camera, the size of the object image becomes small even if the focal length was originally set to the appropriate object size, which necessitates readjustment of the focal length in a telescopic direction. Conversely, when the object moves closer to the camera, the object image increases in size, which necessitates readjustment of the focal length in a wide-angle direction. In short, it is necessary to repeat zooming frequently according to the movement of the object.

There exist conventional video cameras which perform zooming via a manual operation. Such video cameras are inconvenient in that, as described above, zooming must be performed frequently when filming a mobile object.

It is therefore desirable to make auto-zooming available.

However, in case of auto-zooming, the following problems exist:

1) If the zoom speed is fixed, it cannot follow a rapidly-moving object; while if the object movement is slow, the zooming operation becomes jerky, resulting in an undesirable screen image.

2) When a conversion lens used to change the focal length is separately mountable, the focal length of the camera itself must be set differently depending on whether or not the conversion lens is mounted.

3) Where the camera has a pause function which enables it to temporarily stop shooting, and another object passes across the camera while it is pausing, the automatic zooming function zooms in on the other object, using a different focal length than that appropriate for the original object. Therefore, when the pause button is released, the focal length may be inappropriate.

4) In the case of an inner-focus or rear-focus type optical system, even where the object distance remains the same, performing a zooming operation creates a discrepancy regarding the location of the focusing lens. (In the case of an optical system which performs focusing by moving the front lens, even if zooming is performed, the location of the front lens does not change so long as the object distance remains the same.)

Moreover, in such optical systems, when the optical system is set to the wide-angle setting through zooming, it is difficult to obtain accurate information as to the object distance because the focusing lens changes its location only within an extremely small range (see FIG. 20), and when the optical system is set to the wide-angle setting, the field depth is large. Because of this, if the object distance is to be determined based on the location of the focusing lens, and zooming is to be automatically performed according to the object distance thereby determined, it is necessary to use an extremely precise sensor to accurately determine the location of the focusing lens.

SUMMARY OF THE INVENTION

It is an object of this invention to solve the above problems and to provide a video camera possessing an accurate and convenient auto-zoom function.

In order to solve problem (1) above, this invention is structured so that the zoom speed is variable and is determined in accordance with the speed of change in object distance.

Moreover, in order to solve problem (2) above, this invention is structured so that the mounting of a conversion lens is automatically detected and the means for determining focal length is chosen based on the results of such detection.

Further, in order to solve problem (3) above, this invention is structured so that zooming is prohibited while shooting is on pause.

In order to solve the above problem (4), this invention is Structured so that the location of the focusing lens at the time of zooming toward the wide-angle setting is memorized, and when the focusing lens passes this memorized location during auto-focusing operation, zooming is performed toward the telephoto setting.

Other and further objects, features and advantages of the invention will appear more fully from the following description.

BRIEF DESCRIPTION OF THE DRAWINGS

FIG. 3 is a graph showing the relation between object distance and focal length.

FIG. 4 is a table showing the operation speed of the actuator.

FIG. 5 is a block diagram of the optical system and the control system of the second embodiment of this invention.

DESCRIPTION OF THE PREFERRED EMBODIMENTS

The first embodiment of this invention will be explained below referring to drawings.

Figure 1:
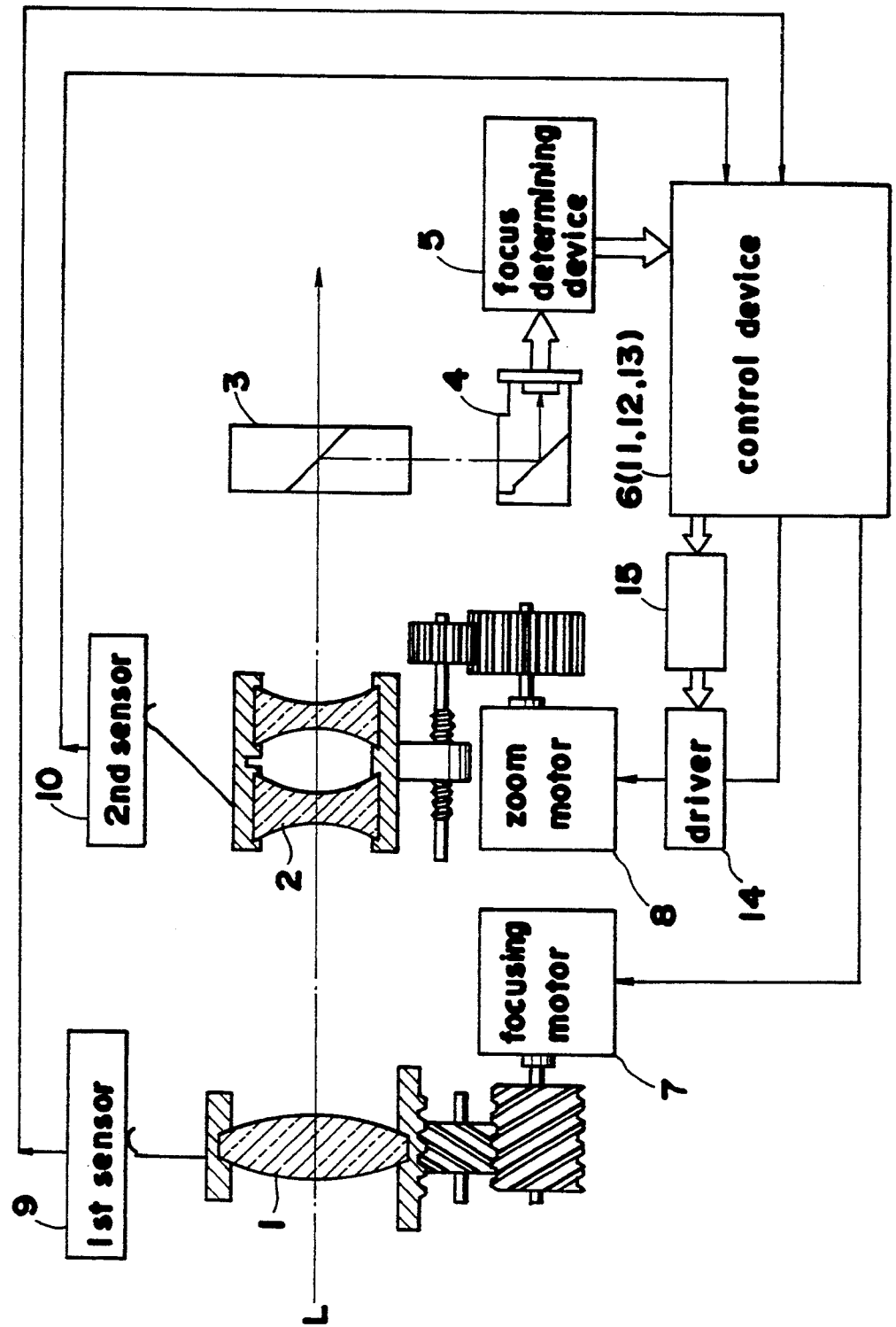
FIG. 1 is a block diagram of the optical system and control system of the first embodiment of this invention.

FIG. 1 is a diagram of a video camera. This camera contains an image-sensing optical system in which front lens (1) for focusing and zoom lens (2) for zooming are aligned along an optical axis (L). On the focusing side of this optical system are located a half-prism (3) and an image-sensing device (not shown in the figure). A ray of light divided by this haft-prism (3) is sent to focus module (4).

The focus module (4) converts the ray of light into an electrical signal by the photoelectric effect and outputs the signal to a focus determining circuit (5). The focus determining circuit (5) determines whether the object image is in focus or not, and if it is not in focus, it outputs the "degree of defocus" to a control device (6).

A focusing motor (7) performs focusing by operating the front lens (1). A zoom motor (8) performs zooming by operating the zoom lens (2). Further, the front lens (1) and zoom lens (2) are connected to a first position sensor (9) and a second position sensor (10), respectively, which detect the lenses respective locations.

The control device (6) has an output system for the control of the focusing motor (7) and zoom motor (8), and an input system to input signals from the first and second position sensors (9) and (10). The control device (6) performs focusing and zooming by operating the focusing motor (7) and zoom motor (8) according to the output from the first and second position sensors (9) and (10) and the signals from the focus determining circuit (5). Here, the zooming operation is controlled so that the magnification of the object becomes almost uniform.

Since the aforementioned focus operation is carried out through a conventional control method, it will not be described in greater detail here. The control method for auto-zooming will be described in detail.

Figure 2:
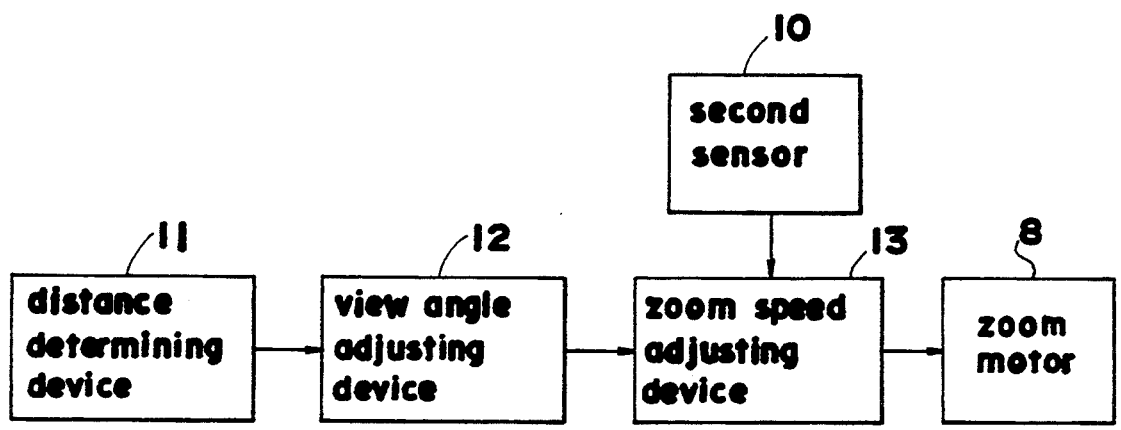
FIG. 2 is a block diagram showing the structure of the control system.

As shown in FIG. 2, the zooming control system includes a distance determining device (11), a view angle adjusting device (12), a zoom speed adjusting device (13), and an actuator (aforementioned zoom motor (8)), with each of the three devices (11), (12) and (13) comprising a program residing in the control device (6). The distance determining device (11) conducts calculations based on the signals from the focus determining circuit (5) and the first position sensor (9) in order to determine the object distance when the object distance has changed. Based on the new object distance, as determined by the distance determining device (11) as described above, the view angle adjusting device (12) determines to which range the object distance belongs, from among the settings of "farther than 10 m", "10 m to 6 m", "6 m to 3 m" and "3 m to 1 m", as shown in FIG. 3, and sets a focal length corresponding to the range selected. Here, "farther than 10 m" corresponds to the longest focal length (T), "10 m to 6 m" to midpoint focal length (M), "6 m to 3 m" to a second midpoint focal length ($M_2$), and "3 m to 1 m" to the shortest focal length (W).

The zoom speed adjusting device (13) selects a speed corresponding to the relation (shown in FIG. 4) between the current location (focal length) of the zoom lens (2), which is read from the second position sensor (10), and the focal length to be set by the view angle adjusting device (12), from among five alternatives. The zoom motor (8) is operated at the speed thus set, and the zoom lens (2) is moved to a location corresponding to the previously-set focal length.

The zoom motor (8) can be a direct current motor, to which a voltage generated by a standard voltage generator (15) is transmitted via a driver (14).

The standard voltage generator (15) is controlled by signals from the control device (6), and operates in synchronization with the focusing operation.

Further, in this embodiment, since focusing is performed by the front lens (1), the front lens (1) remains at the same location, regardless of the focal length, as long as the object distance remains the same; therefore, the object distance can be detected by the signals output from the first position sensor (9) only. However, in case of an inner-focus type or rear-focus type optical system, the object distance differs depending on the focal length even if the focus lens stays in the same location. Therefore, in cameras equipped with an optical system of either such type, signals from the first and second position sensors (9) and (10) are necessary for the detection of object distance.

Moreover, for example, in this video camera, even if a person who is the photo object runs close to the camera, or if the person turns around and runs away from the camera, zooming adjustment is automatically carried out at an appropriate speed, and the person's image is maintained at a size such that their expression is clearly shown at all times, without causing such inconveniences as enlarging the image across the screen, or reducing it excessively. Zooming may be controlled to permit a functional relation of the first or second degree between the object distance and focal length.

In addition to the above embodiment, the zooming speed may be controlled in such a manner to permit a functional relation of the first or second degree between the magnitude of change in the object distance and the zooming speed, without the necessity of incremental adjustment of the zoom speed.

In this invention, instead of determining the change in the object distance from the output of the focus determining circuit (5) as described above, a separate sensor for the determination of the change in object distance may be installed. In addition, the actuator (8) may be a pulse motor instead of a direct current motor.

Next, the second embodiment will be explained. It is different from the first embodiment both in that conversion lenses (18) or (19) are mountable, and in terms of its zoom Control system (see FIG. 5).

Figure 6:
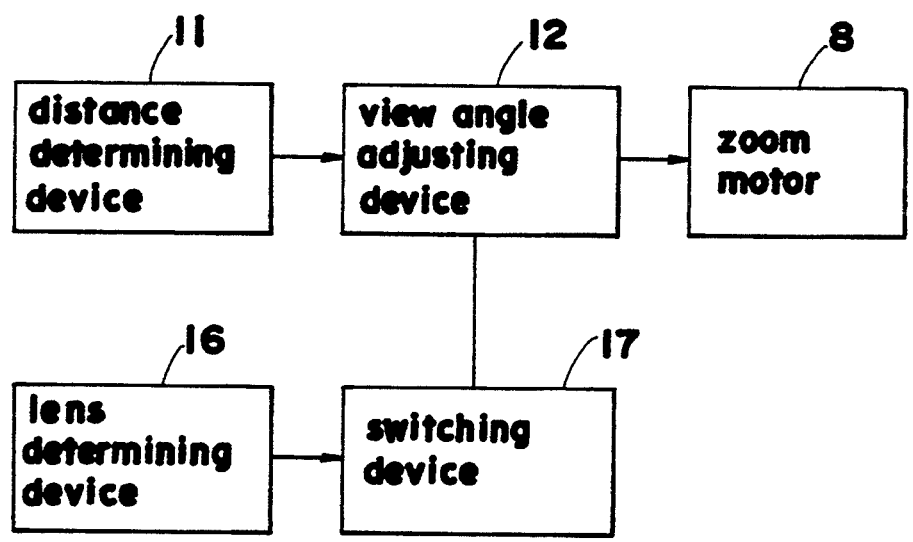
FIG. 6 is a block diagram of the structure of the control system of the second embodiment of this invention.
Figure 7:
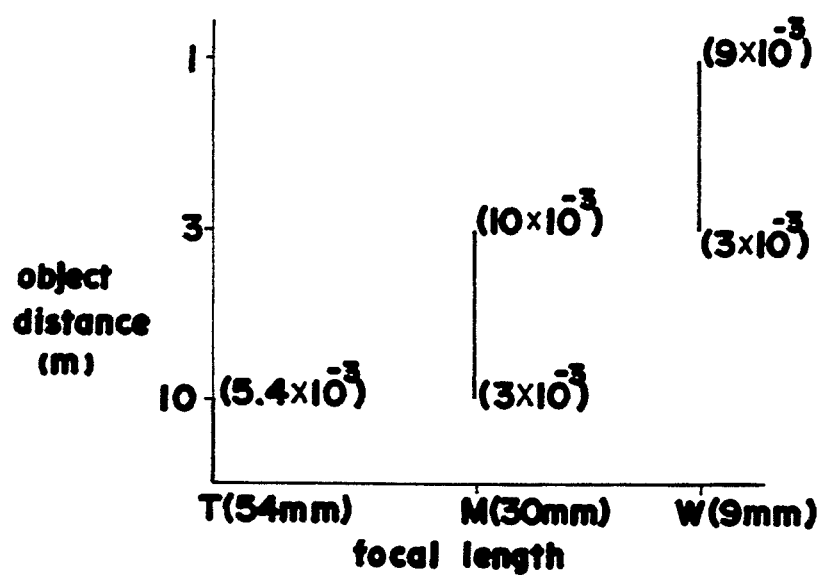
FIG. 7 is a graph showing the relation between the object distance and focal length when no conversion lens is mounted.

As shown in FIG. 6, the zoom control system of this embodiment basically comprises distance determining device (11), a view angle adjusting device (12), and an actuator (aforementioned zoom motor (8)), and the focal length corresponding to the object distance is set in accordance with the graph in FIG. 7.

When the object distance is determined to be "farther than 10 m" by the distance determining device (11), the focal length of the image-sensing optical system is set at the longest focal length (T). When object distance is determined to be within the range of "3 m to 10 m", and when it is determined to be within the range of "1 m to 3 m", the focal length of the image-sensing optical system is set at mid-point focal length (M) or the shortest focal length (W), respectively.

The distance determining device (11) and the view angle adjusting device (12) each comprise a program residing in the aforementioned control device (6). Additionally, the image-sensing optical system is designed so as to be able to change its focal, length from 9 mm to 54 mm: where the longest focal length (T) corresponds to 54 mm, the mid-point focal length (M) corresponds to 30 mm, and the shortest focal length (W) corresponds to 9 mm. Further, the auto-zooming operation takes place in synchronization with the focusing operation.

This video camera is also structured so that either of the two types of conversion lenses, telephoto (18) or wide-angle (19), can be mounted. It is structured so that the view angle adjusting device (12) is automatically altered to prevent the object from being excessively enlarged or reduced when either of these conversion lenses (18) or (19) is mounted.

A notch sensor (20) is located in the vicinity of the front lens (1), and contains pressure-operated contact (20a). The contact (20a) is pressed in by a projection (18a) or (19a) formed on the conversion lenses (18) or (19), respectively, when one of these two conversion lenses is mounted. The projection sensor (20) outputs voltage which corresponds to the stroke of the projection on the contact. The output signals from the projection sensor (20) are input into the control device (6).

The control device (6) contains a lens type determining device (16), which determines the appropriate type of conversion lens depending on the signals from the projection sensor (20), and a switching device (17), which automatically changes the view angle adjusting device (12) depending on the results of the determination of the lens type determining device (16). The lens type determining device (16) and the switching device (17) reside in the control circuit (6) as programs.

Figure 8:
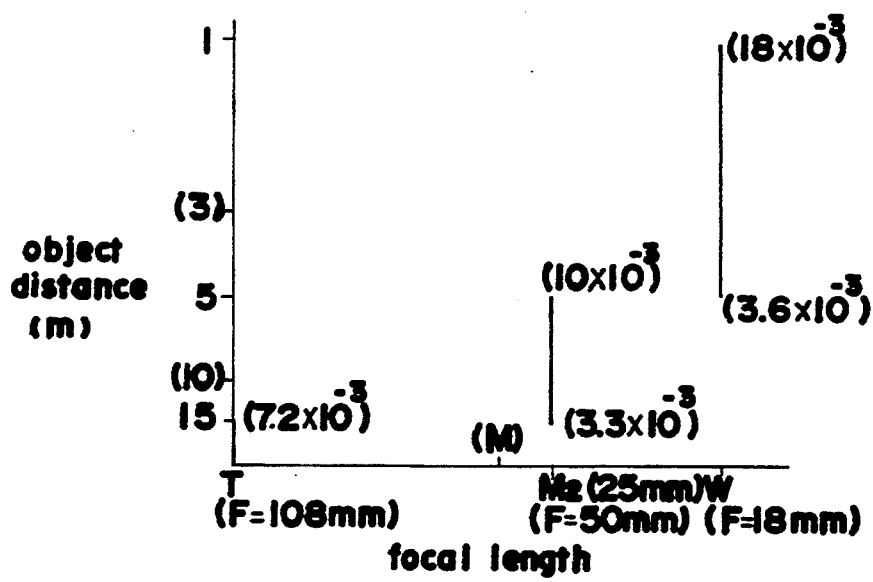
FIG. 8 is a graph showing the relation between the object distance and focal length when a telephoto conversion lens is mounted.

When a telephoto conversion lens (18) (with a 2.0 magnification) is mounted, it is determined whether the object distance is "farther than 15 m", "5 m to 15 m", or "1 m to 5 m", as shown in FIG. 8. If it is determined to be "farther than 15 m", the longest focal length (T) (54 mm) is chosen. Here, the actual focal length (combined focal length) is 108 mm, due to the functioning of the conversion lens. If the object distance is determined to be "5 m to 15 m", the second mid-point focal length ($M_2$) (25 mm) is chosen, and if it is determined to be "1 m to 5 m", the shortest focal length (W) (9 mm) is chosen. The combined focal lengths of ($M_2$) and (W) are 50 mm and 18 mm, respectively.

Figure 9:
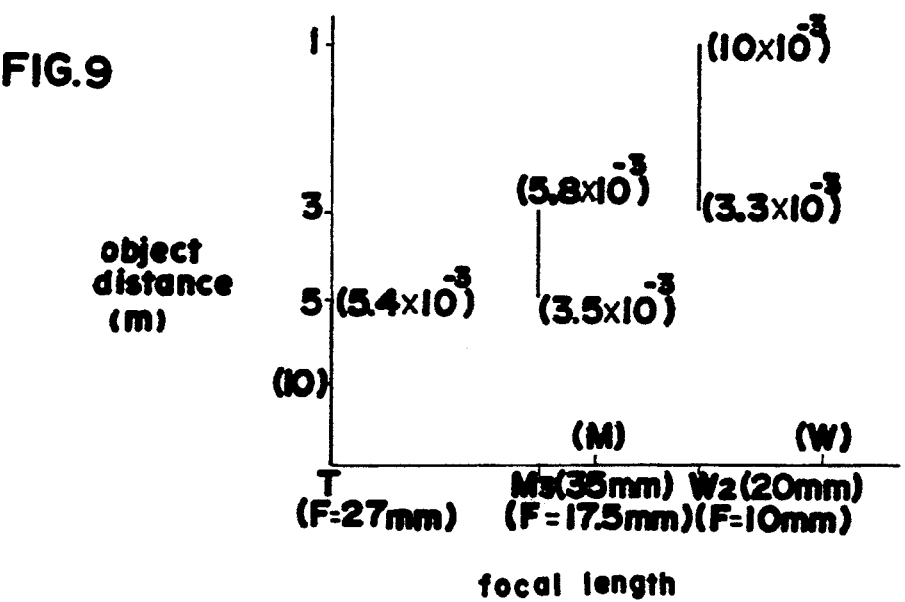
FIG. 9 is a graph showing the same relation when a wide-angle conversion lens is mounted.

When a wide-angle conversion lens (19) (with a 0.5 magnification) is mounted, it is determined whether the object distance is "farther than 5 m", "3 m to 5 m" or "1 m to 3 m", as shown in FIG. 9. If it is determined to be "farther than 5 m", focal length (T) (54 mm) is chosen; if it is "3 m to 5 m", a third mid-point focal length ($M_3$) (35 mm) is chosen; and if it is "1 m to 3 m", a second short focal length ($W_2$) (20 mm) is chosen. The respective combined focal lengths of (T), ($M_3$) and ($W_2$) are 27 mm, 17.5 mm and 10 mm, respectively.

The second mid-point focal length ($M_2$) is a location wherein the zoom lens (2) is set to a 25 mm focal length when a conversion lens is not mounted. The third mid-point focal length ($M_3$) and the shortest focal length ($W_2$) are locations wherein the zoom lens (2) is set to focal lengths of 35 mm and 20 mm, respectively, when a conversion lens is not mounted.

The number in parentheses in the coordinates of the graphs in FIGS. 7–9 is the object magnification. As it is clear from this number, in this embodiment, it is possible to limit the object magnification to a certain range. In other words, the size of the object image can be limited to a certain range.

When a telephoto conversion lens is mounted, the focal length tends to be set so that the object magnification is lager than when it is not mounted, for the same object distance. Conversely, when a wide-angle conversion lens is mounted, the focal length tends to be set so that the object magnification is smaller than when it is not mounted for the same object distance.

Further, in this embodiment, as in the first embodiment, since the focusing operation is performed by the front lens (1), the location of the front lens (1) remains the same for the same object distance regardless of the focal length. Therefore, the object distance can be detected only by signals output from the first position sensor (9). However, in the case of an inner-focus or rear-focus type optical system, the object distance varies for different focal lengths even if the focus lens remains in the same location. Therefore, with cameras having an optical system of either such type, signals from the first and second position sensors (9) and (10) are necessary for the detection of object distance.

Figure 10:
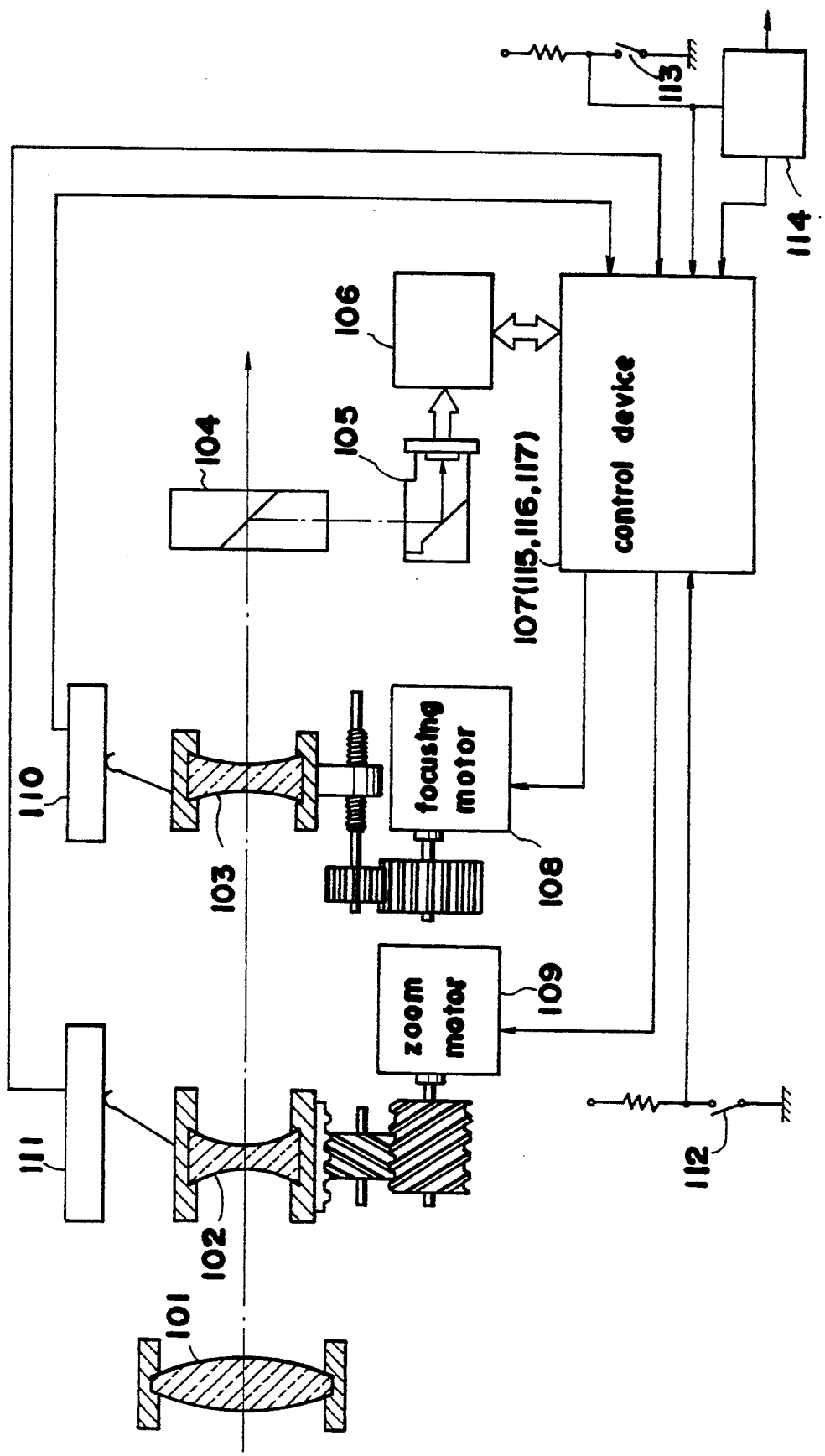
FIG. 10 is a block diagram of the optical system and the control system of the third embodiment of this invention.

Next, the third embodiment will be explained. FIG. 10 shows a diagram of a video camera. This camera has an image-sensing optical system in which fixed front lens (101), zoom lens (102) for zooming operation and focus lens (103) for focusing operation are aligned along optical axis (L). On the focus side of the optical system is located a half-prism (104) and an image-sensing device (not shown in the figure). The ray of light divided by a half prism (104) is sent to a focus module (105).

The focus module (105) converts a ray of light into an electrical signal by the photoelectric effect and sends the signal to a focus determining circuit (106), which determines whether or not the object image is in focus. If it is not in focus, the circuit outputs the "degree of defocus" to a control device (107).

The control device (107) is a microprocessor (not shown in the figure), to which are connected a focusing motor (108) to operate the aforementioned focusing lens (103), a zoom motor (109) to operate the aforementioned zoom lens (102), a first position sensor (110) to detect the location of the focusing lens (103) and a second position sensor (111) to detect the location of the zoom lens (102). The focusing motor (108) can be a pulse motor.

This video camera is structured so that when filming an object, the control device (107) calculates the degree of movement for the focusing lens (103) based on the "degree of defocus" output from the focus determining circuit (106), and operates the focusing motor (108), thereby performing auto-focusing.

This video camera also has a mechanism for manual zooming (not to be described in great detail), a mechanism for auto-zooming and a self-timer mechanism which pauses shooting for a certain time and resumes shooting when the time has elapsed. (Although the self-timer mechanism is a one-time function, it may be used for interval shooting.) During shooting, by operating mode shift switch (112), either the auto-zoom mode or manual zoom mode is selected; by turning a recording switch (113) ON, shooting is put on hold (pause), and when a certain amount of time set in a counter (114) has elapsed, shooting is resumed.

Figure 12:
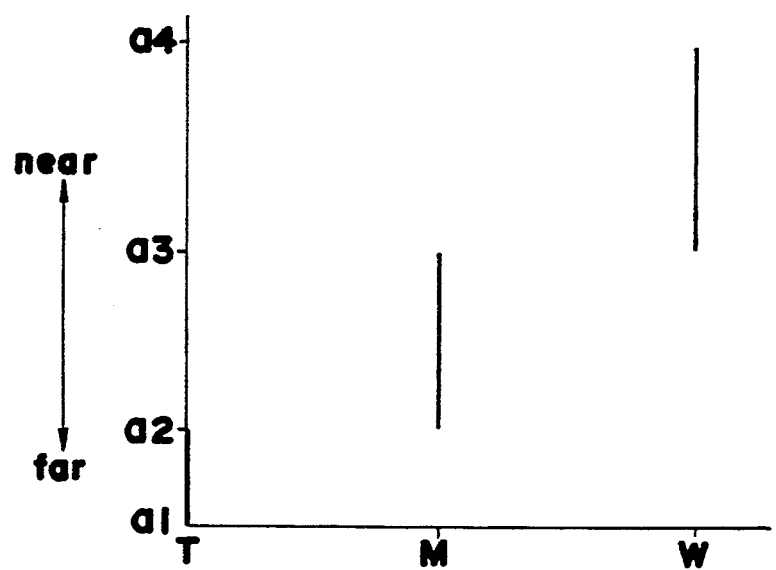
FIG. 12 is a graph showing the relation between the object distance and focal length.

The auto-zooming mechanism performs zooming according to the relation between the object distance and focal length shown in FIG. 12, as in the case of the previous embodiment, and permits little variation in the size of the object on the screen.

The above explanation outlines the auto-focusing and auto-zooming operations. In addition to these operations, this video camera is also structured so that auto-zooming may be prevented when the serf-timer is operated. This control operation to prevent auto-zooming will be explained below together with the auto-focusing and auto-zooming operations.

Figure 11:
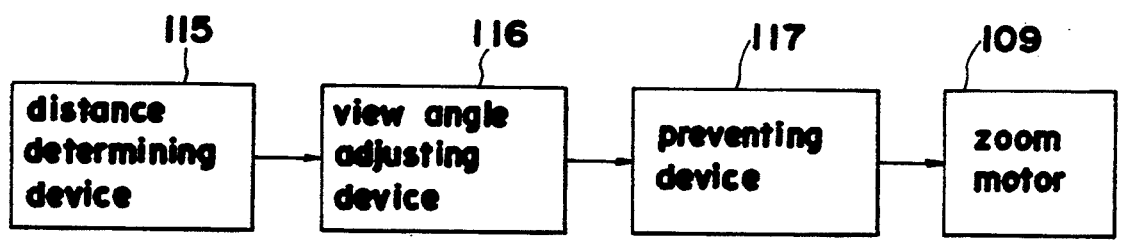
FIG. 11 is a block circuit diagram of the structure of the control system of the third embodiment of this invention.

The auto-zooming operation and the control system to prevent this operation comprise, as shown in FIG. 11, the following: (1) a distance determining device (115), which determines the pre-move and post-move locations of the object, in other words, relative object distance, based on the detection results of the first and second position sensors (110) and (111), as well as the "degree of defocus" determined by the aforementioned focus determining circuit (106); (2) a view angle adjusting device (116), which sets the focal length of the image-sensing optical system at either the telephoto end (T), the mid-point (M) or the wide-angle end (W), based on the detected results of the above-mentioned distance determining device (115); (3) a preventing means (117), which prevents auto-zooming as controlled by the view angle adjusting device (116) during pause mode when the aforementioned recording switch (113) is turned ON and the camera is in pause mode; and (4) an actuator (zooming motor (109)). The three devices (115), (116) and (117) comprise programs residing in the control device (107).

Figure 13:
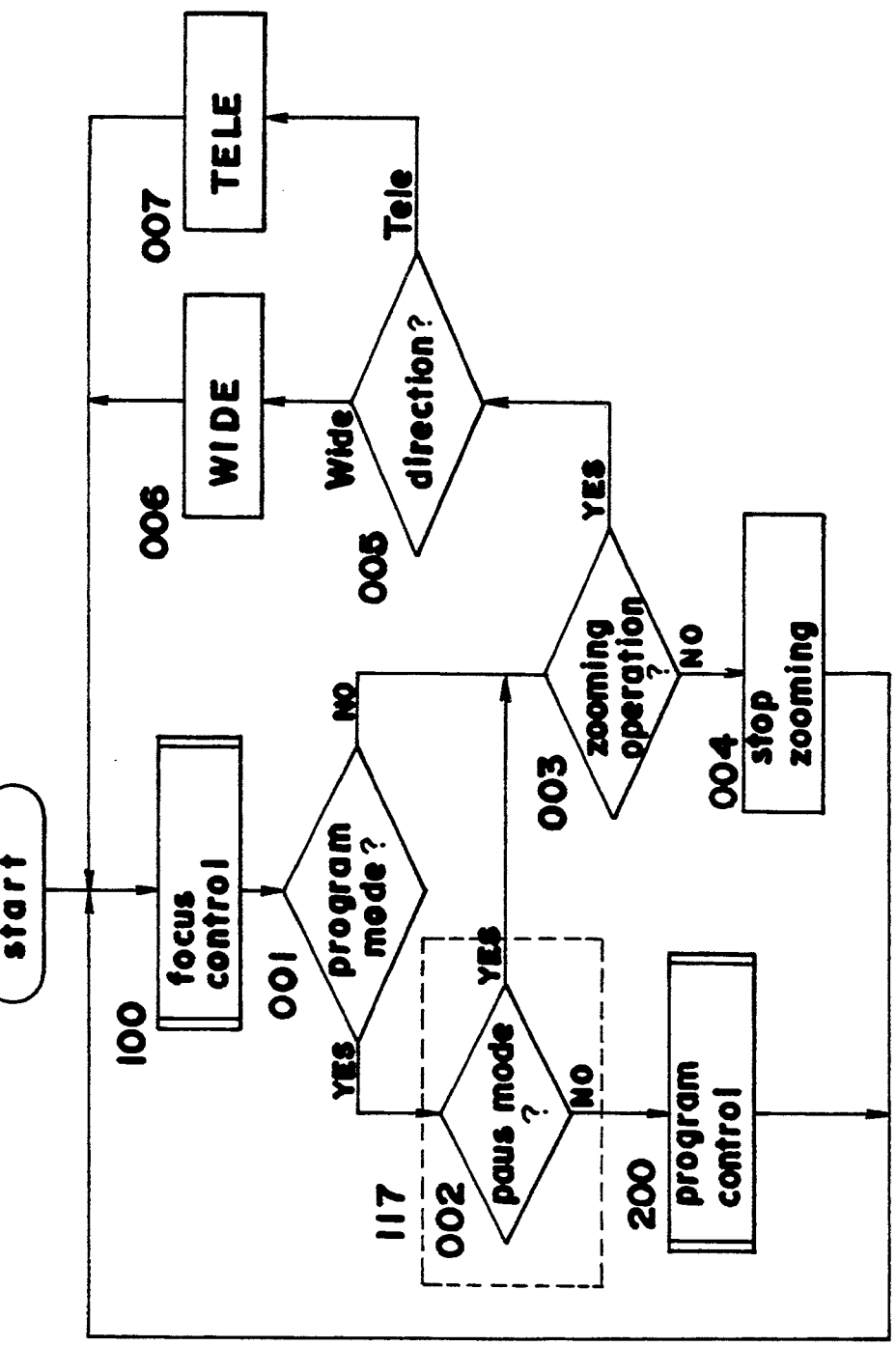
FIG. 13 is a flow chart of the main operation of the control system.

The main operation of this control device (107) can be shown as in the flow chart contained in FIG. 13. When the control function begins, focus control is performed (Step #100). Then, the control mode is determined based on the status of switch (112) (Step #001).

If it is determined that the camera is in program mode, i.e., auto-zooming mode in Step #001, it is then determined whether or not the camera is in pause mode. If it is not in pause mode, program control is performed (Steps #002 and #200).

If it is determined that the camera is not in program mode in Step #001, and when it is determined that the camera is in pause mode in Step #002, it is determined whether zooming is being performed manually (Step #003). If zooming is not being performed, the operation of the aforementioned zoom motor (109) is stopped (Step #004) (and if this operation was already stopped prior to this determination, such status is maintained).

If zooming is being performed in Step #003, the direction of the operation (telephoto or wide-angle) is determined (Step #005), and said zoom motor is operated in accordance with this determination (Steps #006 and #007).

Figure 14:
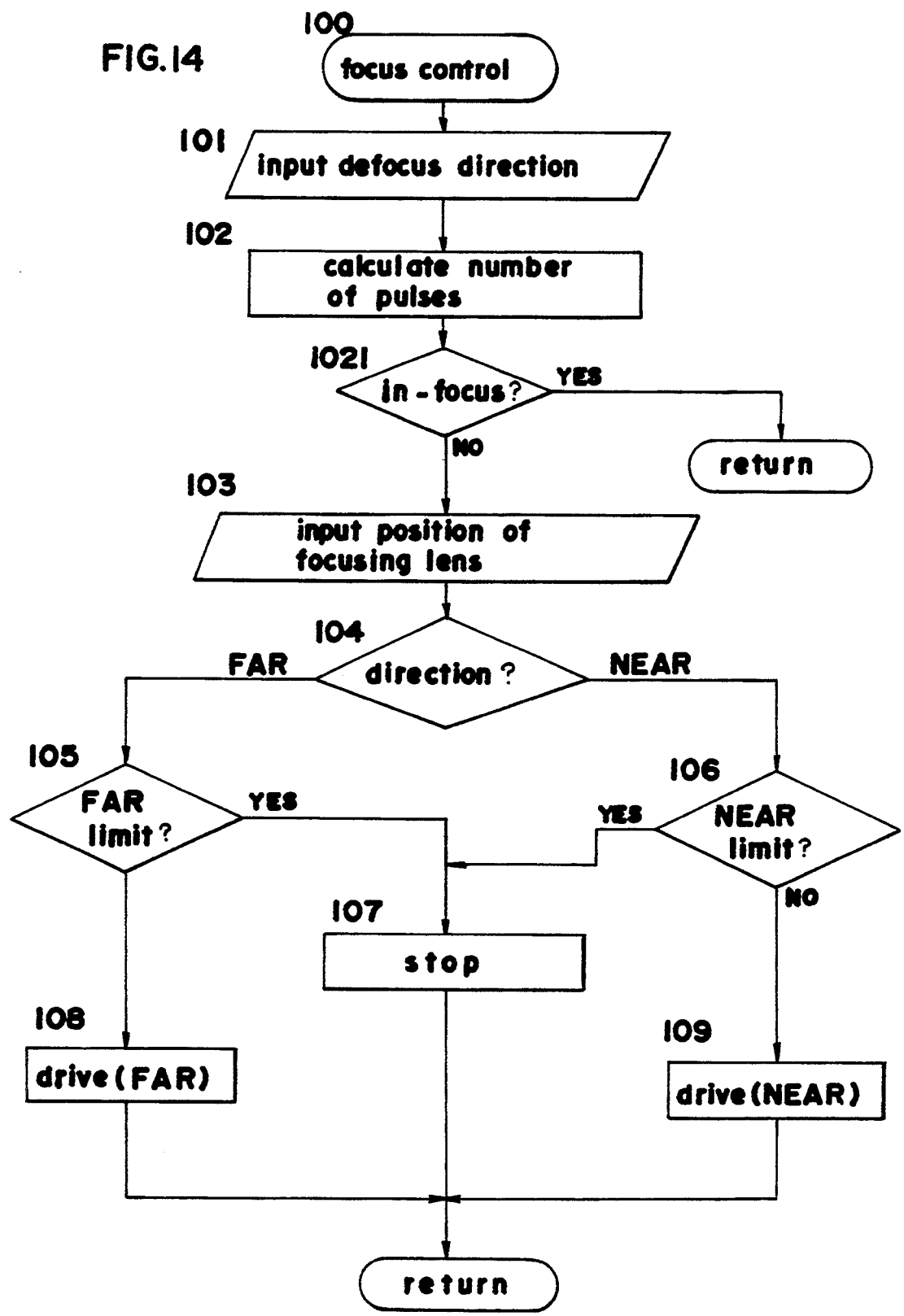
FIG. 14 is a flow chart of the sub-routine of the focus control.
Figure 15:
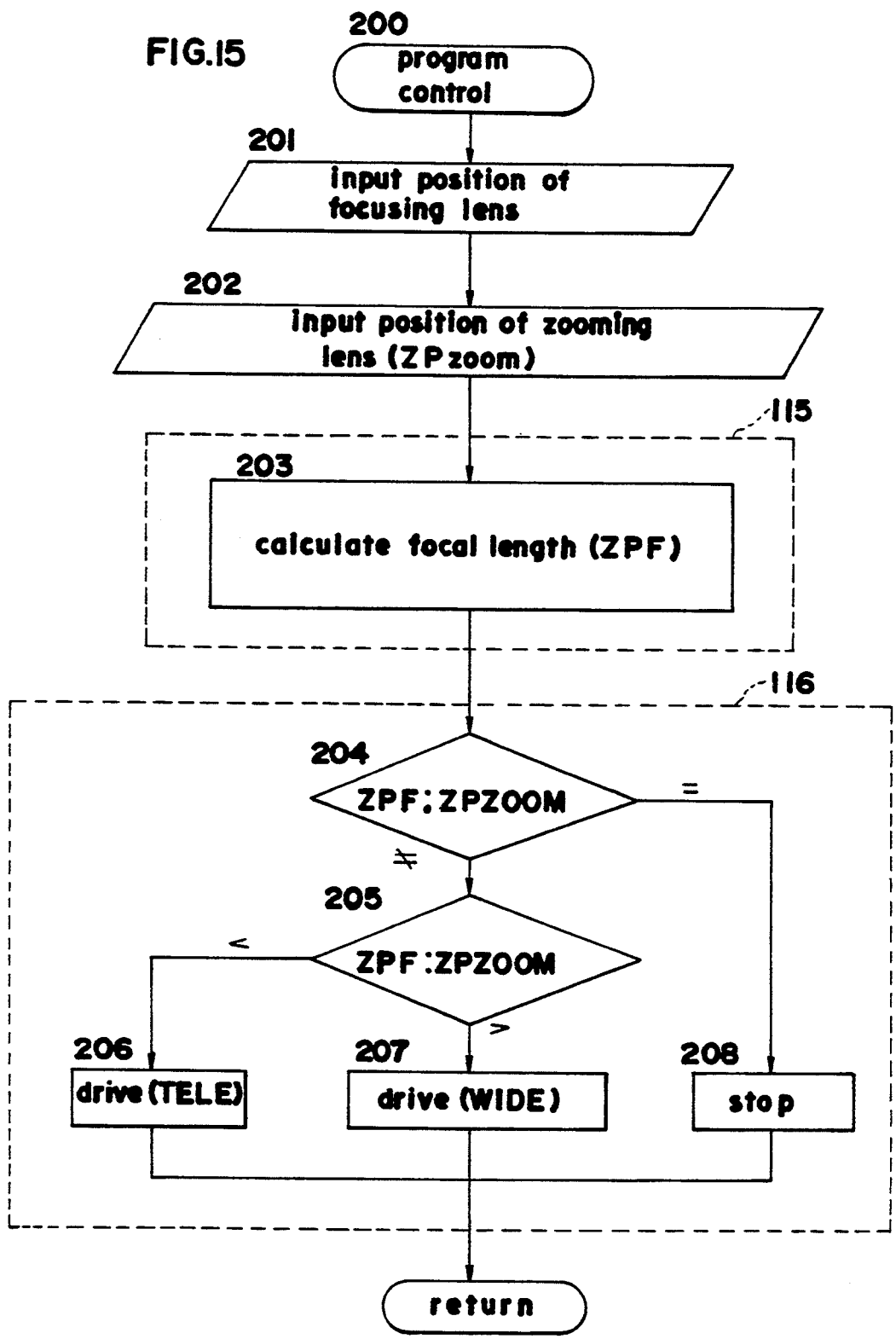
FIG. 15 is a flow chart of the sub-routine of the program control.
Figure 16:
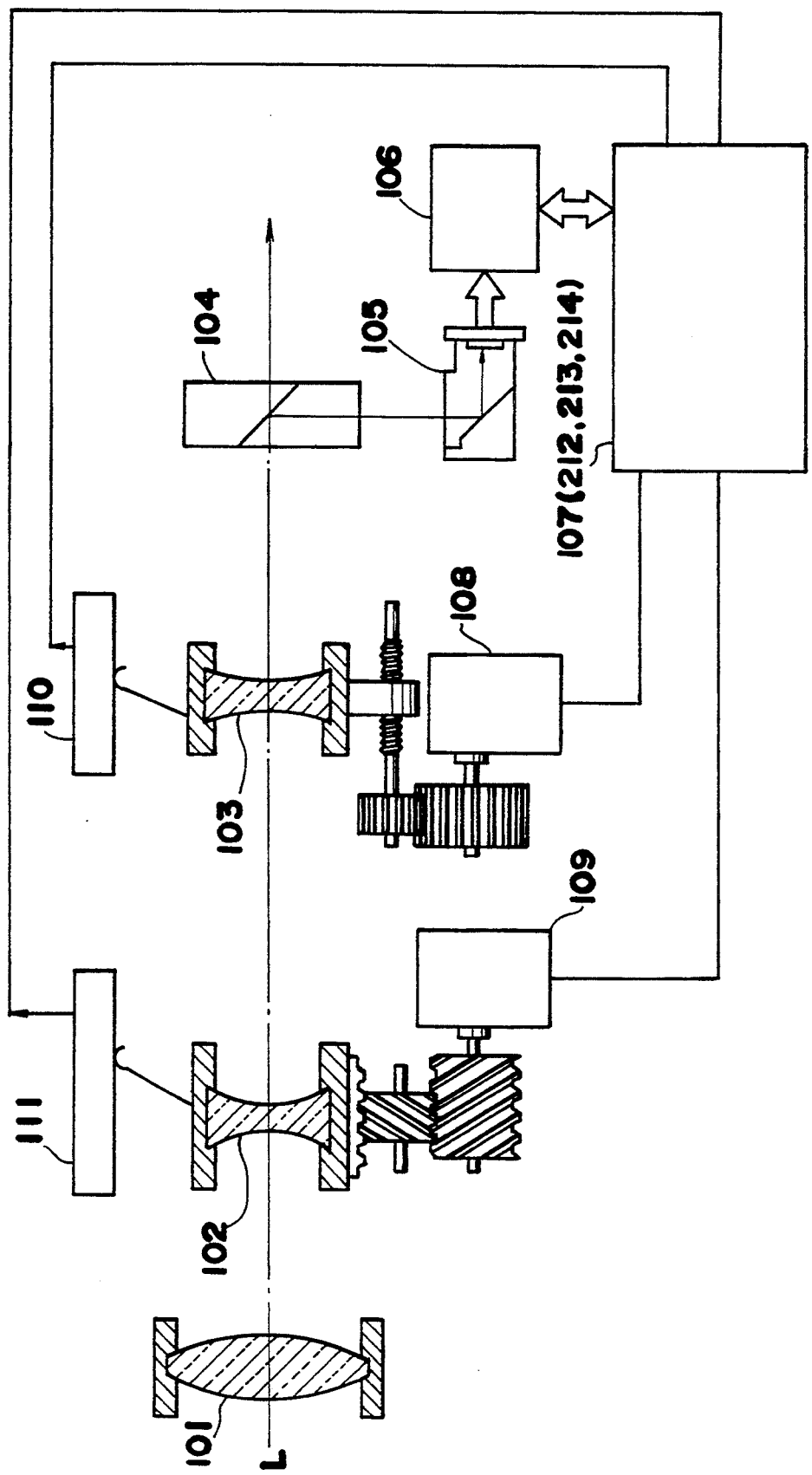
FIG. 16 is a block diagram of the image-sensing optical system and the control system of the fourth embodiment of this invention.

Steps #100 and #200 operate according to the flow charts in FIGS. 14 and 15, respectively.

In Step #100, according to the signals from the aforementioned focus determining circuit (106), the "degree of defocus" of the object point against the focal point is input (Step #101), and the number of pulses necessary to operate the focusing motor (108) so as to offset the discrepancy is calculated (Step #102).

It is then determined, based on the results of this calculation, whether or not the camera is already in-focus (Step #102). If it is determined to be in-focus, the sequence returns as before, and if it is determined not to be in-focus, the sequence moves to Step #103.

Next, after inputting the current location of focusing lens (103) from the aforementioned first position sensor (110) (Step #103), the operation direction (whether toward the "far" or "near" direction) is determined (Step #104).

If it is determined that the operation direction should be toward the "far" direction, it is determined whether the lens is already at the "far" limit (Step #105). If it is at the "far" limit, the operation stops (Step #107), and if not, the lens is moved toward the "far" direction (Step #108).

Similarly, if it is determined that the operation direction should be toward the "near" direction, the operation is stopped if the lens is already at the "near" limit, and if not, the lens is moved towards the "near" direction (Steps #106, #107 and #109).

In Step #200, together with the input of the current location of the focusing lens (103) based on the signals from the first position sensor (110) (Step #201), the current location of the zoom lens ZPZOOM is input according to the signals from the second position sensor (111) (Step #202), and the object distance is determined from the above information and the "degree of defocus" output from the aforementioned focus determining circuit (106). Then, according to the object distance thus determined, focal length ZPF, previously set as shown in FIG. 12 is calculated (Step #203).

After this, ZPF and ZPZOOM are compared (Step #204) and only when they are not equal, the larger of the two is determined (Step #205). Based on this determination, the direction of operation is set and the zoom lens (102) is moved to the point corresponding to ZPF calculated above (Steps #206 and #207). If ZPF and ZPZOOM are determined to be equal in Step #204, the zoom lens (102) is not moved (Step #208).

In the above flow chart, the means of determining the focal point as shown in Step #202 is equivalent to distance determining device (115), Steps #203 to #208 are equivalent to view angle adjusting device (116) and Step #002 is equivalent to preventing device (117).

This embodiment may be modified as follows: The operation of the view angle adjusting device may be set so that the focal length of the image-sensing optical system is continuously changed along, for example, a straight line or an exponential curve, based on the object distance, without performing incremental zooming; or, an object distance detecting sensor may be separately installed.

It is also possible to structure the preventing device (117) so that it functions during pause mode when the camera is in interval shooting mode.

Moreover, this invention can be implemented in various forms, including combining these three devices with a comparator and a logic gate.

Next, the fourth embodiment, which is a partial modification of the third embodiment, will be explained.

Figure 18:
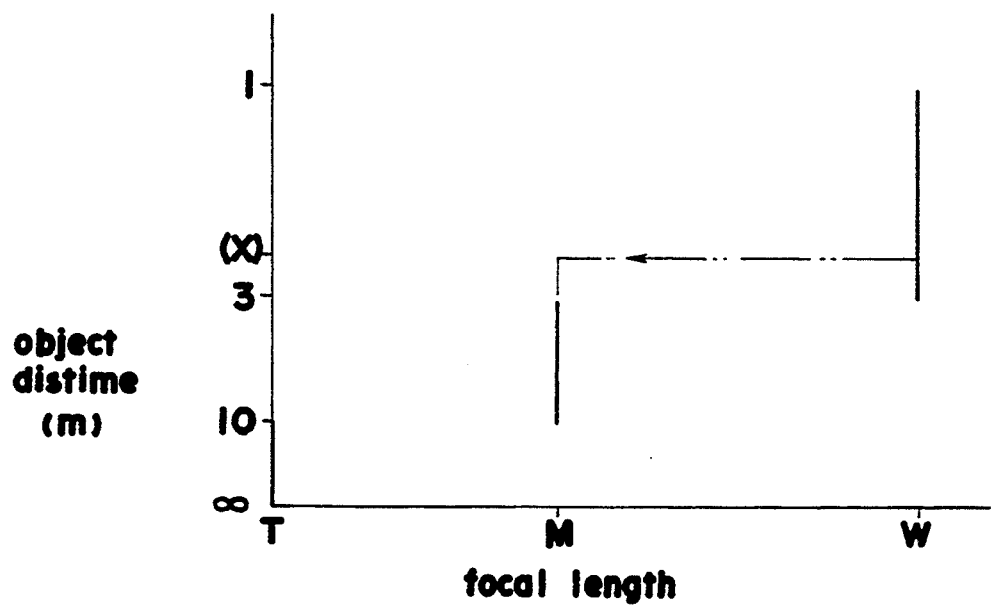
FIG. 18 is a graph showing the relation between the object distance and focal length.
Figure 20:
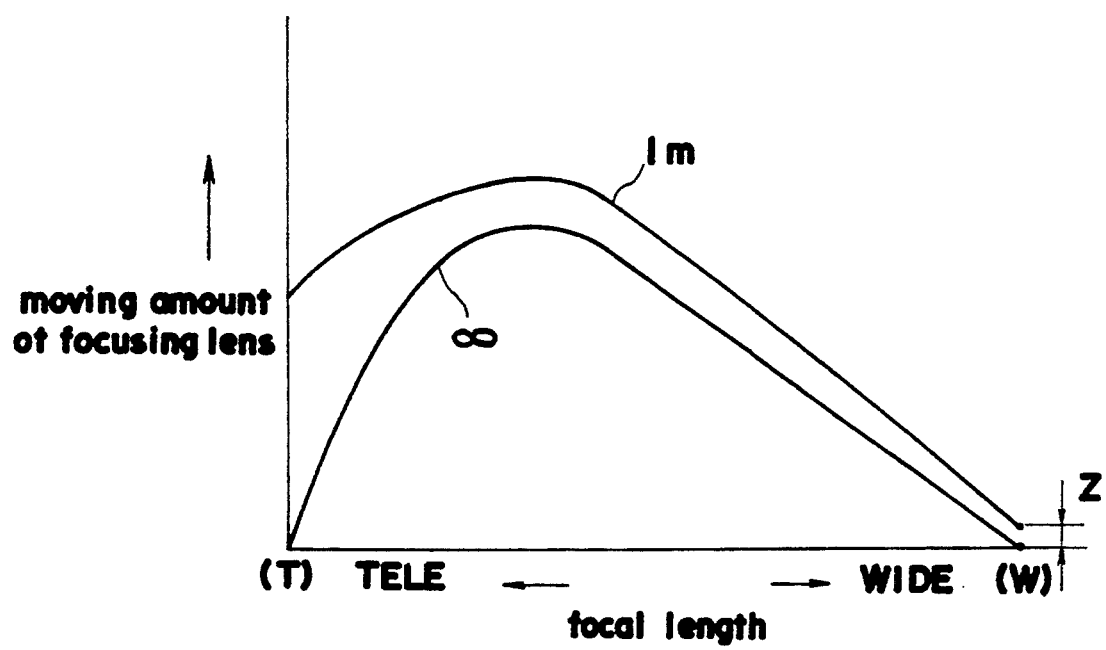
FIG. 20 is a graph showing the degree of change in the location of the focusing lens in relation to the degree of zooming operation in the optical system, for a video camera in which the front lens is fixed.

The fourth embodiment contains a mechanism which automatically sets the focal length according to the object distance (program mode) as in the case of the previous embodiment. In this embodiment, as shown in FIG. 18, the telephoto end (T) corresponds to the object distance "10 m to infinity", the mid-point (M) corresponds to "3 m to 10 m" and the wide-angle end (W) corresponds to "1 m to 3 m".

In order to detect the location of the focusing lens (103) in a non-incremental fashion, a linear potentiometer is used on the aforementioned first position sensor (110).

In this program mode, in order for the zoom lens to be adjusted from the wide-angle end (W) to mid-point (M), the location of the focusing lens (103) is memorized in advance at the time when the zoom lens (102) is switched from the mid-point (M) to the wide-angle end (W); and, when the focusing lens (103), driven by the auto-focus mechanism, passes this memorized point towards the "far" limit, zoom lens (102) is set at the mid-point (M).

Figure 17:
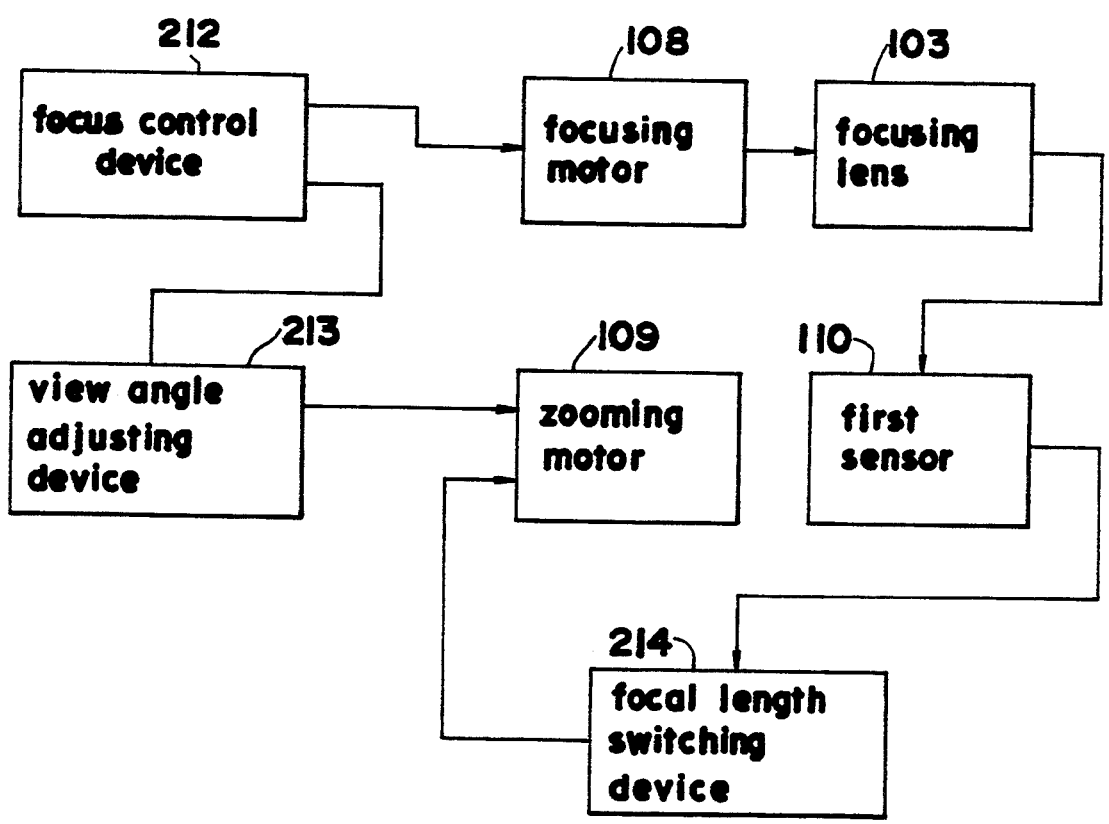
FIG. 17 is a block circuit diagram of the structure of the control system of the fourth embodiment of this invention.

The structure explained above is shown in FIG. 17. A focus control device (212) is a means to perform auto-focusing. A view angle adjusting device (213) is a means to perform auto-zooming. A focal length switching device (214) is a means to adjust zoom lens (102) from the wide-angle end (W) to the mid-point (M). Each of these devices comprises a program residing in the control device (107). The location detecting device is the first position sensor (110) itself.

Figure 19:
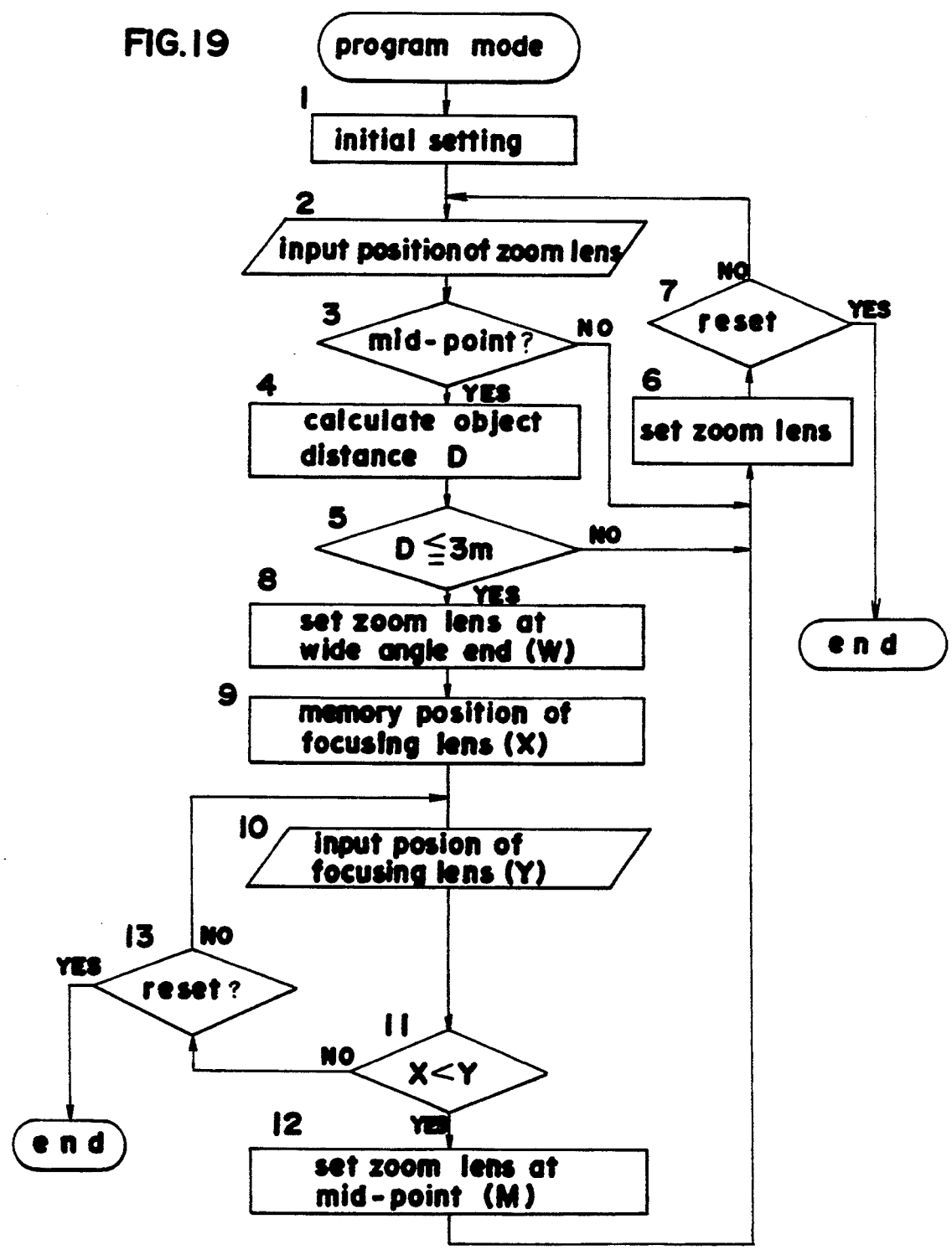
FIG. 19 is a flow chart of the operation of the control system.

In this video camera, operation by the focus control device (212) (auto-focusing) takes place at all times during shooting (the operation will not be described in great detail). The operations by the view angle adjusting device (213) and the focal length switching device (114) (operation in the program mode) are shown in the flow chart contained in FIG. 19.

When program mode control starts, initial setting determination takes place (Step #1), and it is determined whether or not the zoom lens (102) is set at the mid-point (M) (Steins #2 and #3). If it is not set at the mid-point (M), or if the object distance (D) is over 3 m even when the lens is set at the mid-point (M) (Steps #4 and #5), the operation to change the location of the zoom lens (102) is repeated in auto-focusing mode until the program mode is reset (Steps #6 and #7).

If it is determined in Step #5 that said object distance (D) is 3 m or shorter, the zoom lens (102) is set at the wide-angle end (W), and the location (X) of the focusing lens (103) at this point in time is memorized in a memory unit (not shown in the figure) (Steps #8 and #9).

After this, the location (Y) of the focusing lens (103) that changes through auto-focusing is measured at extremely short intervals (Step #10). Then, the point (X) memorized above and (Y) are compared. At the moment when (Y) surpasses (X), the zoom lens (102) is set at the mid-point (M) (Steps #11 and #12), and the sequence moves to the aforementioned process of Step #6.

It is also structured so that the camera can escape program mode via a reset operation during the routines of Steps #10 and #11 (Step #13).

In the image-sensing optical system of this video camera, the number of operations carried out by the zoom lens (102) is approximately ten times as high as that by the focusing lens (103). Therefore, when the location of the focusing lens (103) is memorized at the point when the zoom lens (102) is switched to wide-angle end (W), the focusing lens (103) has already reached the focal point. Because of this, if the object has moved in a very short time, the lens may be switched from the wide-angle end (W) to the mid-point (M) as shown by the dotted line in FIG. 18, even when the object distance is 3 m or shorter.

The fourth embodiment can be modified as follows: Three or more focal lengths may be set while in program mode. It is also possible to structure the focus control device (212), view angle adjusting device (213) and the focal length switching device (214) by hardware combining a logic gate, a comparator, etc. The image-sensing optical system may also be structured as a rear-focus type system.

Although the invention has been described in its preferred form with a certain degree of particularity, it is understood that the present disclosure of the preferred form may be changed in the details of construction and the combination and arrangement of parts may be resorted to without departing from the spirit and the scope of the invention as hereinafter claimed.

What is claimed is:

1. A zooming device comprising:
   an object lens:
   a zoom lens located in the object lens for setting the focal length for the object lens;
   a driver for moving the zoom lens;
   an output means for outputting information related to object distance;
   a focal length determining means for determining the focal length corresponding to said object distance;
   a calculating means for calculating the drive amount for said driver based on the determined focal length;
   a speed determining means for determining a speed corresponding to said drive amount; and
   a driver control means for controlling said driver based on said drive amount and said speed.

2. A zooming device according to claim 1, wherein the output means outputs a position of a focusing lens in the object lens.

3. A zooming device according to claim 1, wherein the output means outputs a defocus amount of the object lens.

4. A zooming device comprising:
   an object lens;
   a zoom lens located in the object lens for setting the focal length for the object lens:
   a driver for moving the zoom lens;
   a detecting means for detecting the degree of change in object distance;
   a speed determining means for determining a speed corresponding to said degree of change; and
   a driver control means for operating said driver at the speed determined by said speed determining means.

5. A zooming device comprising:
   an object lens;
   a zoom lens located in the object lens for setting the focal length for the object lens;
   a driver for moving the zoom lens;
   an object speed detecting means for detecting an object speed;

a zooming speed determining means for determining a zooming speed corresponding to the object speed; and a driver control means for operating said driver at the zooming speed.

6. A zooming device according to claim 5, wherein object speed detecting means detects a degree of change of an object distance.

7. A zooming device comprising:

an object lens;

a zoom lens located in the object lens which sets the focal length for the object lens;

a driver which moves the zoom lens;

an output device which outputs information related to object distance;

a focal length determining device which determines the focal length corresponding to said object distance;

a calculating device which calculates the drive amount for said driver based on the determined focal length;

a speed determining device which determines a speed corresponding to said drive amount; and a driver control device which controls said driver based on said drive amount and said speed.

8. A zooming device comprising:

an object lens;

a zoom lens located in the object lens which sets the focal length for the object lens;

a driver which moves the zoom lens;

a detecting device which detects the degree of change in object distance;

a speed determining device which determines a speed corresponding to said degree of change; and a driver control device which operates said driver at the speed determined by said speed determining device.

9. A zooming device comprising:

an object lens;

a zoom lens located in the object lens which sets the focal length for the object lens;

a driver which moves the zoom lens;

an object speed determining device which detects an object speed;

a zooming speed determining device which determines a zooming speed corresponding to the object speed; and a driver control device which operates said driver at the zooming speed.

* * * * *